(12) United States Patent
Kiany (10) Patent No.: US 10,997,869 B2
(45) Date of Patent: May 4, 2021

(54) METHODS AND SYSTEMS FOR PROVIDING TYPING PRACTICE TO USERS

(71) Applicant: EdClub, Inc., Rockville, MD (US)

(72) Inventor: Armin Kiany, Bethesda, MD (US)

(73) Assignee: EdClub, Inc., Rockville, MD (US)

( * ) Notice: Subject to any disclaimer, the term of this patent is extended or adjusted under 35 U.S.C. 154(b) by 459 days.

(21) Appl. No.: 16/027,893

(22) Filed: Jul. 5, 2018

(65) Prior Publication Data

US 2020/0013308 A1    Jan. 9, 2020

(51) Int. Cl.
*G09B 13/04*    (2006.01)
*G06F 3/16*    (2006.01)

(52) U.S. Cl.
CPC ............. *G09B 13/04* (2013.01); *G06F 3/165* (2013.01)

(58) Field of Classification Search
CPC ........... G09B 13/04; G09B 5/06; G06F 3/165; G06F 3/167
See application file for complete search history.

(56) References Cited

U.S. PATENT DOCUMENTS

| | | | |
|---|---|---|---|
| 5,718,590 A | 2/1998 | Choate | |
| 6,084,576 A | 7/2000 | Leu et al. | |
| 6,120,298 A * | 9/2000 | Jenkins | G09B 7/04 434/118 |
| 8,327,287 B2 | 12/2012 | Kuroume et al. | |
| 9,589,477 B2 | 3/2017 | Ellsworth et al. | |
| 2001/0014440 A1 | 8/2001 | Oyama et al. | |
| 2006/0183092 A1 | 8/2006 | Kogo | |
| 2007/0166675 A1* | 7/2007 | Atkins | G09B 7/00 434/236 |
| 2007/0248938 A1* | 10/2007 | Ronald | G09B 17/003 434/178 |
| 2007/0298385 A1* | 12/2007 | Jenkins | G09B 19/06 434/156 |
| 2011/0098928 A1* | 4/2011 | Hoffman | A63B 71/0622 702/5 |
| 2013/0244211 A1* | 9/2013 | Dowling | G16H 20/30 434/247 |
| 2017/0228153 A1* | 8/2017 | Chow | G06F 3/04886 |
| 2017/0269925 A1* | 9/2017 | Edmonds | G06F 9/451 |

* cited by examiner

*Primary Examiner* — Eddy Saint-Vil
(74) *Attorney, Agent, or Firm* — Kanika Radhakrishnan; Evergreen Valley Law Group (57) ABSTRACT

A method and a system for providing a typing practice to users are disclosed. The method includes displaying a portion of a story on a User Interface (UI) in an electronic device. The portion of the story comprises a plurality of displayed words, where each displayed word comprises one or more displayed characters. The method includes enabling a user to provide typing input, where the typing input comprises one or more input characters for each displayed word of the plurality of displayed words in a sequential manner. The method includes checking whether input character matches to corresponding displayed character of the portion of the story. The method further includes provisioning an animated graphics in the UI upon detection of match between the input character and corresponding displayed character and precluding the provisioning of the animated graphics in the UI upon detection of mismatch between input character and corresponding displayed character.

20 Claims, 9 Drawing Sheets

METHODS AND SYSTEMS FOR PROVIDING TYPING PRACTICE TO USERS

TECHNICAL FIELD

Embodiments of the disclosure relate generally to touch-typing and, more particularly to, methods and systems for providing typing practice to users.

BACKGROUND

With rapid improvements in computer technology, people across the globe have embraced necessary skills for using computers or similar devices. The importance of computer skills is at an all-time high and specifically touch-typing has become an ever-increasing attribute requisite from any existing staff or a prospective candidate for working with computer systems. Touch-typing is basically an art of knowing how to type without relying on your sense of sight. Specifically, a touch typist will know the location of specific keys on the keyboard through muscle memory. Touch-typing enables a user to write (type) without exercising caution about how the user is writing, thereby allowing the user to focus on what idea that is explicitly expressed via writing.

Touch-typing is a skill that users learn by continuous exercise and repetition. Continuous exercise and repetition ensure that the users build muscle memory. If the tool that users/touch typists are using is not engaging and dull, they will quickly lose interest and boredom may kick in.

In light of the above discussion, there appears to be a need for a touch-typing tool that can keep the users engaged and prevent the users from boredom and entices them to continue practicing their typing skills.

SUMMARY

Various embodiments of the present disclosure provide a method and a system for providing a typing practice to users.

In an embodiment, a method of providing a typing practice to users is disclosed. The method includes displaying at least one portion of a story on a User Interface (UI) in an electronic device. The at least one portion of the story comprises a plurality of displayed words, where each displayed word comprises one or more displayed characters. The method includes enabling a user to provide a typing input. The typing input comprises one or more input characters for each displayed word of the plurality of displayed words in a sequential manner. The method includes checking whether an input character matches to a corresponding displayed character of the at least one portion of the story, upon receiving the typing input. The method further includes provisioning an animated graphics in the UI upon detection of a match between the input character and the corresponding displayed character or precluding provisioning of the animated graphics in the UI upon detection of a mismatch between the input character and the corresponding displayed character.

In another embodiment, a system of providing a typing practice to users is disclosed. The system comprises a memory to store instructions and a processor to execute the instructions stored in the memory and thereby cause the system to perform displaying of at least one portion of a story on a User Interface (UI) in an electronic device. The at least one portion of the story comprises a plurality of displayed words, where each displayed word comprises one or more displayed characters. The system is further caused to enable a user to provide a typing input. The typing input comprises one or more input characters for each displayed word of the plurality of displayed words in a sequential manner The system is further caused to check whether an input character matches to a corresponding displayed character of the at least one portion of the story, upon receiving the typing input. The system is further caused to provision an animated graphics in the UI upon detecting a match between the input character and the corresponding displayed character or to preclude provisioning of the animated graphics in the UI upon detecting a mismatch between the input character and the corresponding displayed character.

In yet another embodiment, a system is disclosed. The system comprises a User Interface (UI) module, an error detection module, a performance computation module and an animation module. The UI module comprises an output interface module and an input interface module. The output interface module displays at least one portion of a story. The at least one portion of the story comprises a plurality of displayed words, where each displayed word comprises one or more displayed characters. The input interface module receives a typing input from a user. The typing input comprises one or more input characters for each displayed word of the plurality of displayed words in a sequential manner The error detection module checks whether an input character of the one or more input characters matches to a corresponding displayed character of the one or more displayed character of the at least one portion of the story. The animation module provisions animated graphics in the UI upon detecting a match between the input character and the corresponding displayed character of the story or precludes provisioning of the animated graphics in the UI upon detecting a mismatch between the input character and the corresponding displayed character of the story.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide a method and a system for providing typing practice to users.

An embodiment provides a method and a system for providing typing practice to users. A user may use a dedicated touch-typing platform presented at an electronic device associated with the user for learning and/or enhancing his touch-typing skills. The touch-typing platform may present one or more User Interfaces (UI) on a display screen of the electronic device for providing typing practice to users. The touch-typing platform provides an option for the user to select a story from a plurality of stories. In an embodiment, the selected story is displayed to the user on the UI. Alternatively, the UI may display only a portion of the selected story for the user. The story/portion of the story comprises a plurality of displayed words, wherein each displayed word comprises one or more displayed characters. The UI may also have an animated background showing characters and/or objects related with the story/portion of the story and may request the user to provide a typing input. The typing input comprises one or more input characters for each displayed word of the plurality of displayed words. The user may provide the typing input using an input interface associated with the electronic device. It shall be noted that the user provides the typing input corresponding to the plurality of displayed words of the story/portion of the story in a sequential manner.

When the user provides the typing input, each input character of the typing input is compared with a corresponding displayed character of the story/portion of the story to determine whether the typing input matches with the displayed character or not. When the input character in the typing input matches with the corresponding displayed character, animated graphics is provisioned in the UI that creates an engaging experience for the user while learning touch-typing. For example, the animated graphics correspond to animated characters that come alive such as to create an expression of the story being played back visually for the user. In an embodiment, an audio associated with the story or portion of the story is played back to the user upon detecting a match between the input character associated with the typing input and a corresponding displayed character. In at least one example embodiment, the animated graphics may stop and volume corresponding to the audio associated with the story (or portion of the story) may reduce to a pre-defined level, if at least one input character of the typing input provided by the user does not match with the corresponding displayed character. In an embodiment, the provisioning of animated graphics is precluded and volume associated with the audio played back corresponding to story (or part of the story) gets reduced to the pre-defined level when the typing input is not received from the user such as, when the user pauses. Further, a result page is displayed to the user upon completion of providing the typing input corresponding to the story/portion of the story. In at least one example embodiment, the performance of the user is evaluated and at least one evaluation metric is displayed on a result page. The evaluation metric may be any of a typing speed, typing accuracy, typing duration and overall time taken to complete the story/portion of the story. Stories with animated graphics create an engaging experience for the user viewing the story while improving his/her touch-typing skills.

Various embodiments of an electronic device provisioning the touch-typing platform for providing typing practice to users are explained with reference to FIGS. 1-8.

Figure 1:
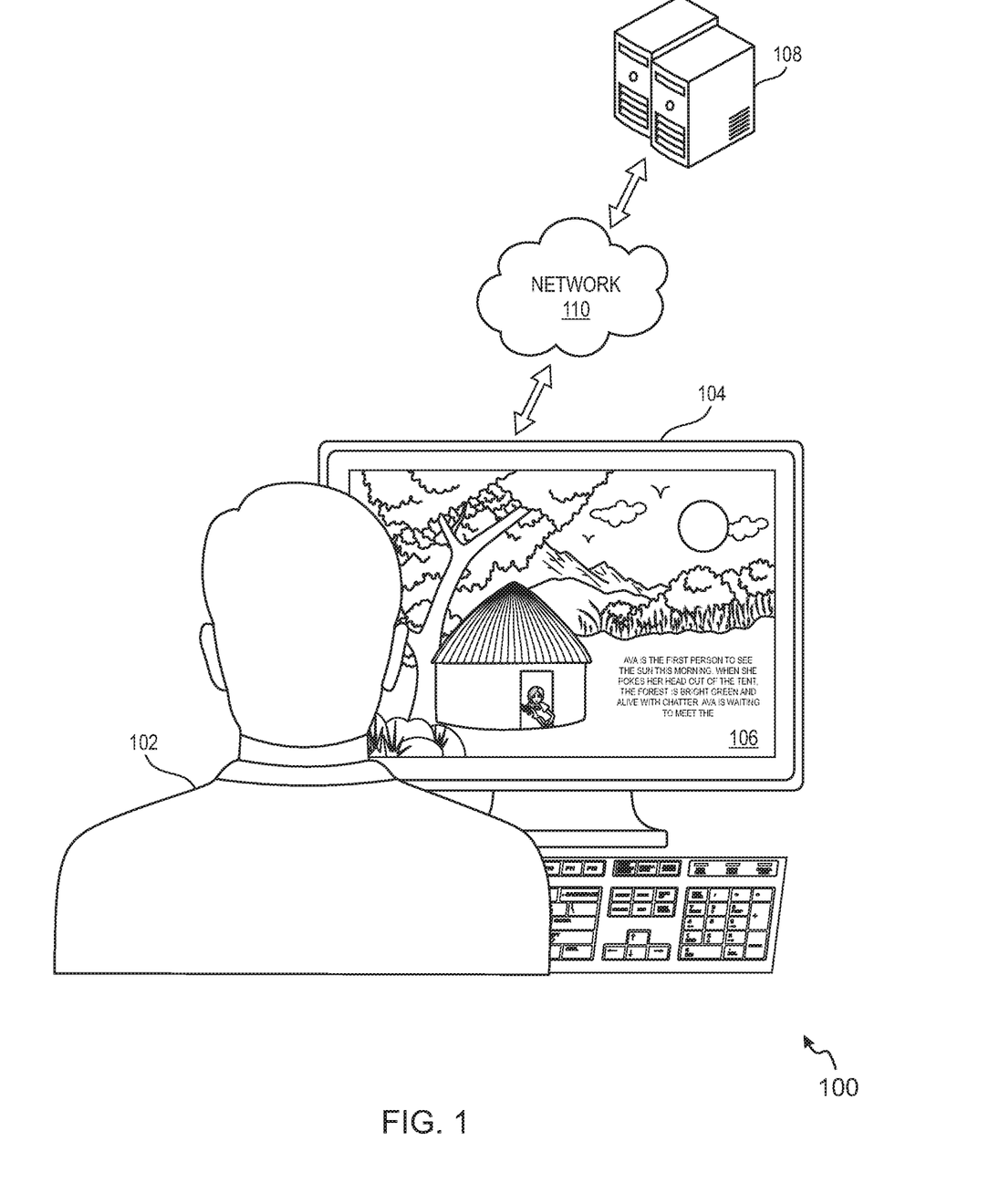
FIG. 1 is an illustration of an environment, where at least some example embodiments can be practiced.

FIG. 1 is an illustration of an environment 100 where at least some example embodiments may be practiced. The environment 100 includes an electronic device 104 deployed to provide typing practice to one or more users, for example, a user 102 through a dedicated touch-typing platform 106. The electronic device 104 is exemplarily depicted as a personal computer. It is understood that the electronic device 104 associated with one or more users, such as the user 102 for learning touch-typing, may be embodied in various forms, such as a tablet computer, a wearable device, a personal digital assistant, a laptop, and the like.

In at least one example embodiment, a server system 108 provides a software application, referred to herein as the touch-typing platform 106, in response to a user request received from the electronic device 104 via a network 110. Examples of the network 110 include stand alone or a combination of a local area network (LAN), a wide area network (WAN), wireless, wired, any currently existing or to be developed network that can be used for communication. More specifically, an example of the network 110 can be the Internet which may be a combination of a plurality of networks. In some embodiments, the touch-typing platform 106 may be factory-installed on the user's electronic device 104 and the user 102 may not need to specifically request the touch-typing platform 106 from the server system 108.

The touch-typing platform 106 is configured to facilitate learning the skill of touch-typing on the electronic device 104. The term 'touch-typing' as used throughout the specification implies providing typing input by the user 102 without viewing a keypad associated with the electronic device 104 such as to improve a typing speed and/or typing accuracy of the user 102. The touch-typing platform 106 may present one or more User Interfaces (UIs) on a display screen of the electronic device 104 for facilitating typing practice to the user 102. In at least one example embodiment, the touch-typing platform 106 may display an UI comprising a plurality of stories to the user 102. The user 102 can select at least one story from the plurality of stories displayed on the UI. In an embodiment, the touch-typing platform 106 may provide an option for the user 102 to select at least a portion from a plurality of portions corresponding to the story selected by the user 102 for displaying on the display screen of the electronic device 104.

In at least one example embodiment, the touch-typing platform 106 displays at least a portion of the story. The portion of the story comprises a plurality of displayed words describing the story. In an embodiment, each displayed word of the plurality of displayed word comprises one or more displayed characters. It shall be noted that the term displayed character includes alphabets but not limited to numbers, symbols, punctuation marks, special characters and space between two consecutive displayed words. In at least one example embodiment, the touch-typing platform 106 may display an animated background showing characters and/or objects related with the story. For example, if the touch-typing platform 106 displays a story of a girl who loves her pet dog, then the background may present a girl cuddling her dog or only a girl. It shall be noted that the animated background may change as the user 102 starts providing a typing input via an input interface of the electronic device 104.

The typing input includes one or more input characters for each displayed word of the plurality of displayed words. It shall be noted that the user 102 provides the typing input corresponding to the plurality of displayed words of the story in a sequential manner. Sequential manner indicates a pattern similar to which displayed characters of the story are listed on the display screen of the electronic device 104. For example, if a sentence of the story reads, "The girl loved to play with her dog every evening after school", the typing input provided by the user 102 in a sequential manner appears as, "'T', 'h', 'e',' ', 'g', 'i', 'r', 'l',' ', 'l', 'o', 'v', 'e', 'd',' ', 't', 'o',' ', 'p', 'l', 'a', 'y',' ', 'w', 'i', 't', 'h',' ', 'h', 'e', 'r',' ', 'd', 'o', 'g', . . . . The typing input provided by the user 102 is validated by the touch-typing platform 106 by matching each input character of the typing input with a corresponding displayed character displayed on the display screen of the electronic device 104 for determining a match/mismatch.

In an embodiment, the touch-typing platform 106 is configured to provision animated graphics if the touch-typing platform 106 determines a match between the input characters of the typing input and the corresponding displayed character. For instance, the animated characters and objects may spring alive when the match is determined. For example, as the user 102 provides typing input, "'T', 'h', 'e',' ', 'g', 'i', 'r', 'l',' ', 'l', 'o', 'v', 'e', 'd',' ', 't', 'o',' ', 'p', 'l', 'a', 'y',', the touch-tying platform 106 determines a match with the displayed characters of the plurality of words and thereby the animated characters of the girl and the dog hover around the display screen creating an engaging experience for the user 102 who visualizes the story as he works on his skill of touch-typing. Additionally, an audio associated with the story is played back to the user 102 when match is determined between the typing input and the displayed characters.

In at least one example embodiment, when the touch-typing platform 106 determines a mismatch between an input character of the typing input and a corresponding displayed character, the provisioning of animated graphics on the display screen is precluded. Additionally or optionally, a volume of the audio may be reduced to a pre-defined level on determining mismatch between the input character and the corresponding displayed character.

The touch-typing platform 106 may be an application/tool resting at the server system 108. In an embodiment, the server system 108 is configured to host and manage the touch-typing platform 106 and communicate with user devices, such as the electronic device 104. The touch-typing platform 106 may be accessed through the web via a network 110. In another embodiment, the electronic device 104 may access an instance of the touch-typing platform 106 from the server system 108 for installing on the electronic device 104 using application stores associated with Apple iOS™, Android™ OS, Google Chrome OS, Symbian OS®, Windows Mobile® OS, Windows Phone, BlackBerry® OS, Embedded Linux, web OS, Palm OS® or Palm Web OS™, and the like.

Figure 8:
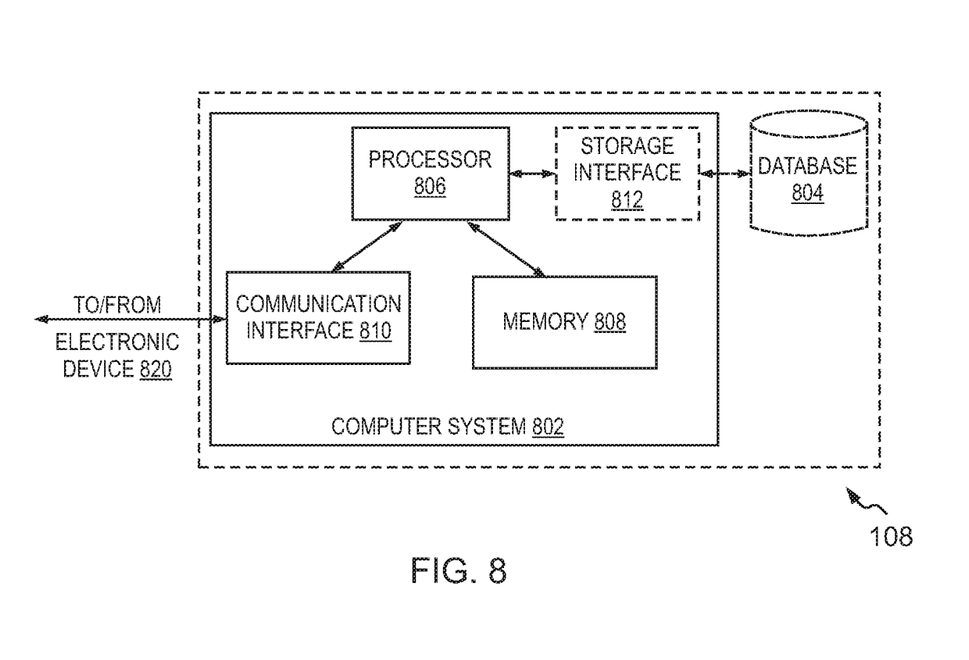
FIG. 8 is a block diagram of the server system of FIG. 1, in accordance with an example embodiment.

It is noted that the instructions (or the executable code) configuring the touch-typing platform 106 are stored in a memory of the server system 108, and the instructions are executed by a processor (for example, a single-core or a multi-core processor) included within the server system 108, as is exemplarily shown with reference to FIG. 8. Accordingly, even though the various functionalities for providing typing practice are explained with reference to or being performed by the touch-typing platform 106, it is understood that the processor in conjunction with the code in the memory is configured to execute the various tasks as enabled by the instructions of the touch-typing platform 106.

The various components of the touch-typing platform 106 are further explained with reference to FIG. 2.

Figure 2:
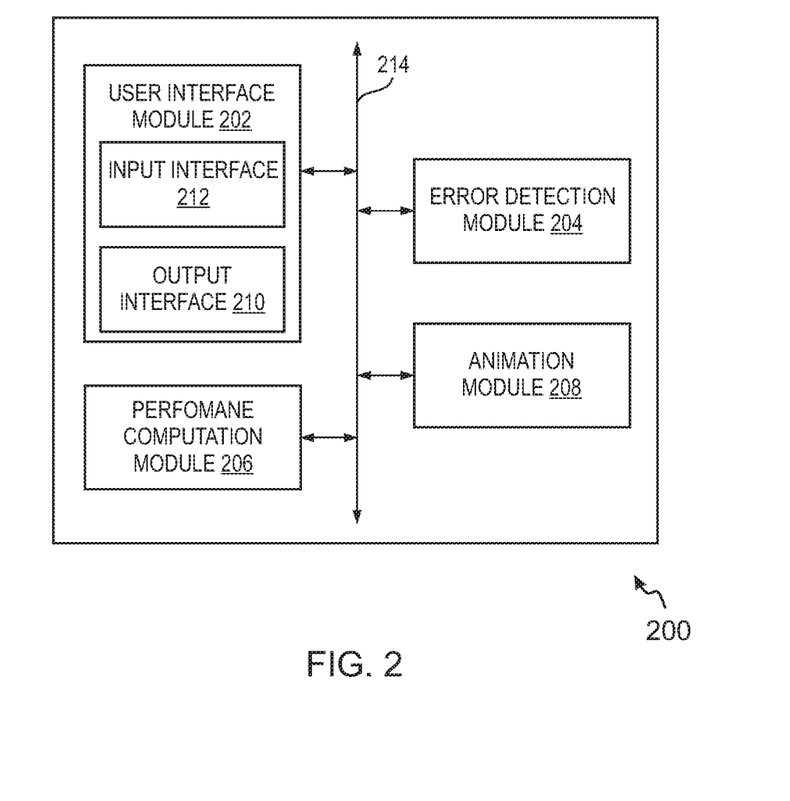
FIG. 2 is a block diagram representation of a system for providing typing practice to users, in accordance with an example embodiment.

FIG. 2 is a block diagram of a system 200 for providing a typing practice to a user (e.g., the user 102), in accordance with an embodiment. The system 200 enables the user to learn touch-typing by providing animated stories that engage the user with animated graphics and prevent boredom. The system 200 comprises a user interface module 202, an error detection module 204, a performance computation module 206, an animation module 208 and a centralized circuit system 214.

The user interface module 202 is configured to present one or more UIs for providing typing practice to the user. The UI module 202 comprises an output interface 210 and an input interface 212. The output interface 210 is configured to display at least a portion of a story. For example, the user interface module 202 provisions options for the user to select at least one story from a list of stories. The story selected by the user may be displayed as a whole or at least one portion of the story is displayed to the user via the output interface 210. In at least one example embodiment, the portion of the story comprises a plurality of displayed words, wherein each displayed word comprises one or more displayed characters. Examples of the output interface 210 may include, but are not limited to, a display such as a light emitting diode display, a thin-film transistor (TFT) display, a liquid crystal display, an active-matrix organic light-emitting diode (AMOLED) display, and the like. The displayed character can be any of a special character, an alphabet, a number, a space or any combination of the above.

The input interface 212 is configured to receive a typing input corresponding to the plurality of displayed words associated with the story from the user. Examples of the input interface 212 may include, but are not limited to, a keyboard, a mouse, a joystick, a keypad, a touch screen, soft keys, and the like. The typing input comprises one or more input characters provided by the user via the input interface 212. The user provides the typing input corresponding to the plurality of displayed words of the story on the output interface 210. The input character can be any of a special character, an alphabet, a number, a space or any combination of the above mentioned characters. It shall be noted that the user provides the typing input in a sequential manner corresponding to the plurality of words displayed on the output interface 210. For instance, if the portion of the story includes the words "With a wink, her friend vanishes into thin air.", then the user will provide typing inputs (input characters) corresponding to the words of the story in a sequential manner starting with 'W', 'i', 't', 'h' and so on. It shall be noted that the spaces provided between the words are also considered in the sequence.

The error detection module 204 is in communication with the UI module 202. The error detection module 204 is configured to determine if the input character associated with the typing input matches with a corresponding displayed character associated with the plurality of words of the story. In at least one example embodiment, the error detection module 204 is configured to generate a control signal to the animation module 208 via the communication interface. The control signal is configured to control display of animated graphics on the output interface 210 based on determining a match/mismatch between the input character of the typing input and the displayed character of the plurality of words. Further, the error detection module 204 is configured to highlight the displayed character in a first color if the input character matches with the corresponding displayed character. Alternatively, the error detection module 204 is configured to highlight the displayed character in a second color if there is a mismatch between the input character and the corresponding displayed character.

The performance computation module 206 is communicably coupled with the UI module 202 and the error detection module 204. The performance computation module 206 is configured to determine at least one evaluation metric. The evaluation metric is a measure of performance of the user, such as user typing speed, typing accuracy, typing duration and overall time. The user typing speed is calculated based on the number of words provided as typing input by the user for a minute (words per minute) via the input interface 212. The typing accuracy is determined based on a report provided by the error detection module 204. The report provides details pertaining to total number of match/mismatch determined between the input character and a corresponding displayed character on the output interface 210. For example, the total number of matches reported by the error detection module 204 are compared with the total number of characters present in the portion of the story for computing an accuracy percentage using the formula:

$$\text{Typing accuracy} = (\text{No. of matches}/\text{No. of characters}) * 100.$$

The typing duration is determined based on a total time taken by the user to complete the portion of the story displayed on the output interface 210. It shall be noted that the duration does not include any pauses more than 5 seconds taken by the user. In at least one example embodiment, the overall time is the cumulative of a typing duration for the portion of the story and all the pauses taken by the user for less than 5 seconds till the completion of the portion of the story. The animation module 208 is communicably coupled with the error detection module 204 and is configured to provision animated graphics on the output interface 210 based on a control signal received from the error detection module 204. In at least one example embodiment, when the error detection module 204 determines a match between an input character of the typing input and the corresponding displayed character, the control signal enables the animation module 208 to provision animation graphics on the output interface 210. Alternatively, when the error detection module 204 determines a mismatch between an input character of the typing input and the corresponding displayed character, the control signal disables the animation module 208 and precludes provisioning of animation graphics on the output interface 210. In an embodiment, the animation module 208 is also configured to perform playback of an audio associated with the portion of the story at different volume levels based on the control signal. In an example scenario, when the error detection module 204 detects a match, the control signal enables the animation module 208 to playback audio associated with the portion of the story at full volume. Alternatively, if the error detection module 204 detects a mismatch between the input character of the typing input and the displayed character, the control signal directs the animation module 208 to perform playback of the audio at volume reduced to a pre-defined level. In at least one example embodiment, when the error detection module 204 detects a pause in the typing input, the control signal is configured to disable the animation module 208 by precluding provisioning of the animated graphics to the output interface 210. Additionally, the control signal is configured to reduce the volume of the audio to the pre-defined level for an interval corresponding to the pause in the typing input.

In at least one example embodiment, the typing speed of the user is used to adapt the speed at which the animated graphics is played back to the user on the output interface 210. The output interface 210 also displays the results computed by the performance computation module 206 for the user after the completion of the portion of the story. The result page is described in detail with reference to FIG. 5.

The user interface module 202, the error detection module 204, the performance computation module 206, the animation module 208 may be configured to communicate with each other via or through the centralized circuit system 214. The centralized circuit system 214 may be various devices configured to, among other things, provide or enable communication between the engines (202-208) of the system 200. In certain embodiments, the centralized circuit system 214 may be a central printed circuit board (PCB) such as a motherboard, a main board, a system board, or a logic board. The centralized circuit system 214 may also, or alternatively, include other printed circuit assemblies (PCAs) or communication channel media. In some embodiments, the centralized circuit system 214 may include appropriate storage interfaces to facilitate communication among the engines (202-208). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3A:
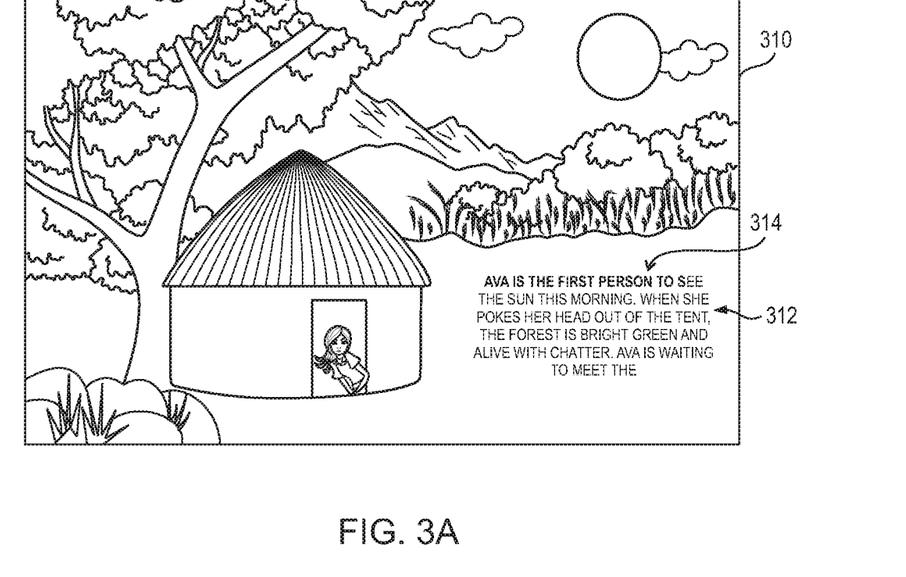
FIG. 3A shows an example representation of a UI depicting a first image frame of animated graphics provisioned on a display screen of an electronic device upon determining a match between a typing input and a displayed character, in accordance with an example embodiment.
Figure 3B:
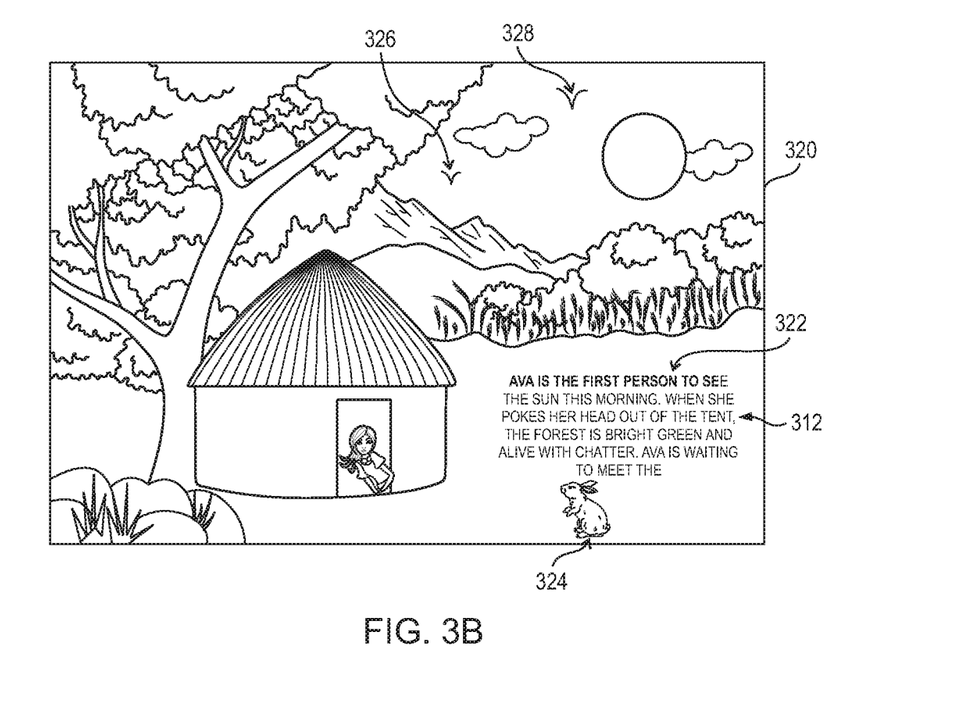
FIG. 3B shows an example representation of a UI depicting a second image frame of animated graphics provisioned on the display screen of the electronic device upon determining a match between a typing input and a displayed character, in accordance with an example embodiment.
Figure 3C:
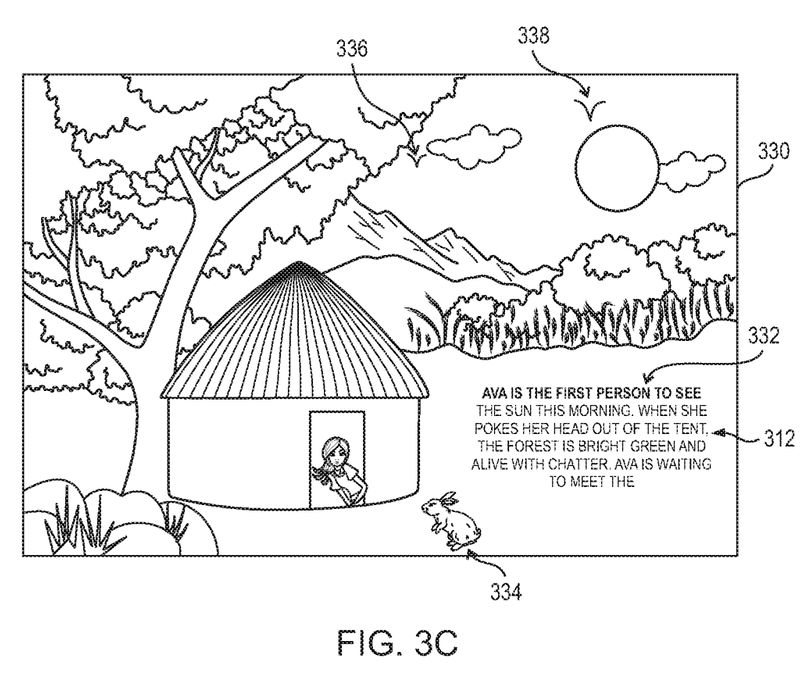
FIG. 3C shows an example representation of a UI depicting a third image frame of animated graphics provisioned on the display screen of the electronic device upon determining a match between a typing input and a displayed character, in accordance with an example embodiment.

Referring now to FIGS. 3A, 3B and 3C, example representations of UIs depicting a video sequence of animated graphics provisioned on a display screen of an electronic device upon determining a match between a typing input and a displayed character, are shown in accordance with an example embodiment. The video sequence of animated graphics comprises a first image frame 310, a second image frame 320 and a third image frame 330 that are consecutively played back on the electronic device to a user upon receiving a correct typing input that matches with corresponding displayed characters.

The first image frame 310 displays a text 312 corresponding to a portion of a story. In this example representation, the story is about a girl named 'Ava' and a rabbit. Accordingly, the first image frame 310 displays one or more objects (animated characters) such as, a girl, sun and tent related with the portion of the story. The text 312 comprises a plurality of displayed words, wherein each displayed word comprises one or more displayed characters. As shown in FIG. 3A, the words 'Ava', 'is', 'the' represent the displayed words and the characters 'A', 'v', 'a' represent the displayed characters of the displayed word 'Ava'.

The user provides a typing input corresponding to the plurality of displayed words of the first image frame 310. The typing input comprises one or more input characters. The user provides the typing input in a sequential manner, for example, 'A', 'v', 'a',' ', . . . . When the user provides an input character that matches with a corresponding displayed character, the one or more objects in the first image frame 310 springs alive. For example, when the user provides input characters corresponding to the displayed word 'Ava' that match with the displayed characters, a playback of animated graphics is initiated and an animated character of the girl may hover around. In this example representation, the first image frame 310 displayed to the user when the user provides a typing input (e.g., 's') that matches with the corresponding displayed character and the displayed characters "Ava is the first person to s" is shown to be highlighted with a first color 314 (shown by bold characters) on determining a match between the input character of the typing input and the displayed character. It shall be noted that the displayed words "Ava is the first person to s" have been highlighted in the first color 314 upon determining a match between the typing input provided by the user and the corresponding displayed character.

As shown in FIG. 3B, when the user provides an input character ('e') that matches with a corresponding displayed character, the animated graphics is played back and the second image frame 320 is displayed to the user. Accordingly, the displayed words ('se') that match with the input character provided by the user are highlighted 322 in the first color indicating that the user has provided a correct typing input. In this example representation, upon detecting the match between the input character and the displayed character, one or more animated characters such as, a rabbit at a location 324 and birds at locations 326 and 328 are provisioned on the display screen. It shall be noted that the introduction of the one or more animated characters at locations 324, 326 and 328 on the second image frame 320 represents a continuous playback of animated graphics on the display screen of the electronic device upon the user providing the typing input that matches with the displayed character.

As shown in the third image frame 330, when the user provides an input character ('e') that matches the corresponding displayed character, a part of the text 312 "Ava is the first person to see" is highlighted 332 in the first color indicating that the user has provided the typing input that matches with the displayed words. The animated graphics is continuously provisioned on the display screen on detecting the match and as such, the third image frame 330 depicts the animated characters of Ava, rabbit and the birds. However, the locations 324, 326 and 328 of the rabbit and the birds, respectively may slightly change as they are depicted to be moving (see, FIG. 3B). In this image frame, the continuous playback of the animated graphics on detecting the match between the input character and the displayed character is depicted by a change in location 334, 336 and 338 of the rabbit and the birds from the locations 324, 326 and 328 shown in FIG. 3B.

Figure 4A:
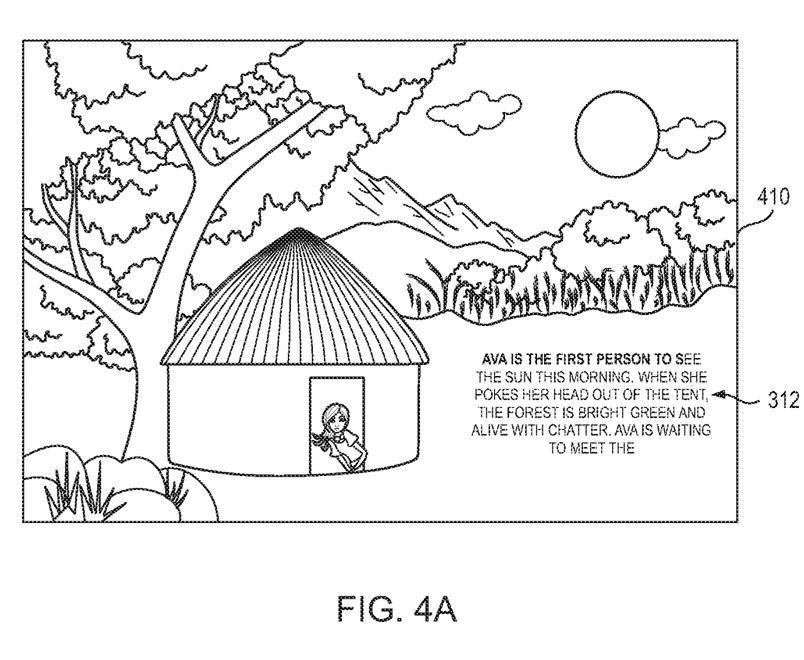
FIG. 4A shows an example representation of a UI depicting a first image frame of animated graphics provisioned on the display screen of the electronic device upon determining a mismatch between a typing input and a displayed character, in accordance with an example embodiment.
Figure 4B:
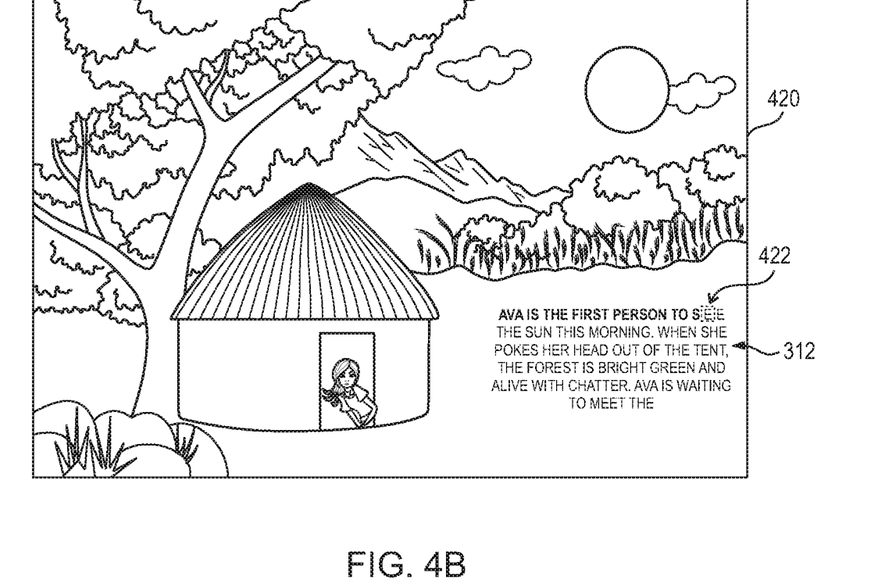
FIG. 4B shows an example representation of a UI depicting a second image frame provisioned on the display screen of the electronic device upon determining a mismatch between a typing input and a displayed character, in accordance with an example embodiment.
Figure 4C:
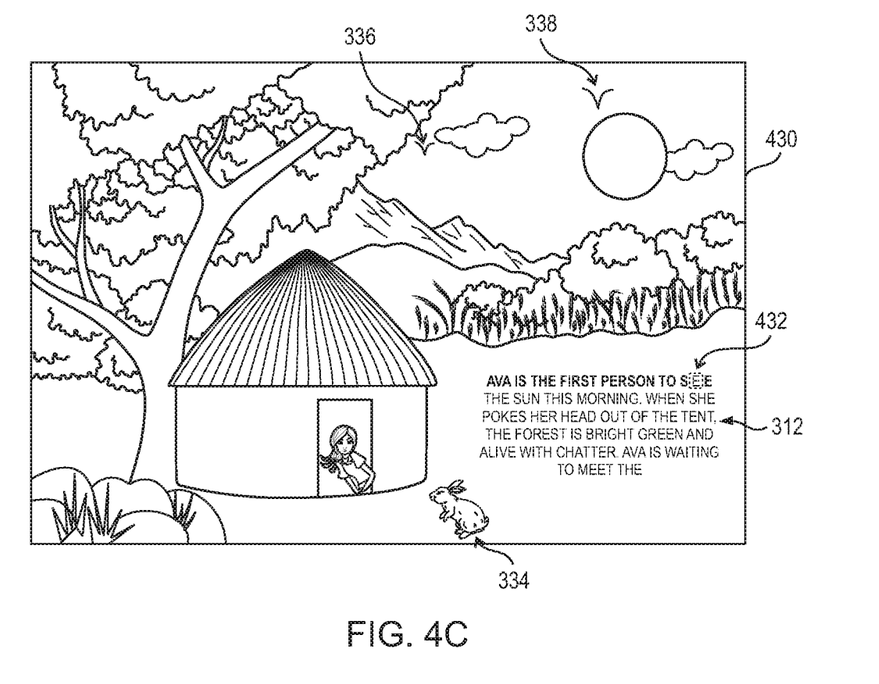
FIG. 4C shows an example representation of a UI depicting a third image frame provisioned on the display screen of the electronic device upon user correcting an error in the second image frame, in accordance with an example embodiment.

FIGS. 4A, 4B and 4C show an example representation of UIs depicting video sequence of animated graphics as provisioned on the display screen of the electronic device upon determining a mismatch between a typing input and a displayed character, in accordance with an example embodiment. It shall be noted that the UIs described with reference to FIGS. 4A-4C are displayed to a user, such as the user 102 willing to learn/enhance touch-typing skill. The video sequence of animated graphics comprises image frames 410, 420 and 430 (also referred to herein as 'first image frame 410', 'a second image frame 420' and 'a third image frame 430') that are played back consecutively as the user provides the typing input. As seen in FIG. 4A, the user provides an input character 's' that matches with a corresponding displayed character as shown in FIG. 4B. It shall be noted that the first image frame 310 and the image frame 410 are identical and the image frame 410 has been shown for description of playback of animated graphics when a mismatch is determined between the typing input and a displayed character. The displayed character 's' is highlighted using a first color (shown by bold characters) which represents the user has provided the input character that matches with the displayed character ('s'). The playback of animated graphics is initiated upon determining the match between the input character and the displayed character. In this example representation, the displayed words "Ava is the first person to s" are highlighted using the first color (shown as bold characters) as the input character provided by the user match with the corresponding displayed words.

Referring now to FIG. 4B, the user provides an input character 'a' that does not match with the displayed character 'e'. The determination of mismatch between the input character and the displayed character in the image frame 420 precludes provisioning of the animated graphics on the display screen of the electronic device. Accordingly, the animated graphics are paused and appear same as those depicted in FIG. 4A. In at least one example embodiment, a volume of an audio associated with the portion of the story is reduced to playback at a second level upon detecting the mismatch. The input character that does not match with the displayed character is highlighted in a second color 422 (shown in a block) such as to provide an indication that the user has provided an incorrect typing input. The displayed words "Ava is the first person to s" is highlighted in a first color indicating that the user has provided the correct typing input. It shall be noted that the term 'correct typing input' implies typing input provided by the user that matches with the corresponding displayed character and the term 'incorrect typing input' implies a mismatch between the typing input provided by the user and the corresponding displayed character. In at least one example embodiment, the user corrects the mismatch by providing an input character as correct typing input for the corresponding displayed character. Although, the user may correct the input character to match the corresponding displayed character, the word associated with the incorrect typing input is highlighted in the second color 432 (see, FIG. 4C).

In at least one example embodiment, the animated graphics and audio is provisioned on the UI when the user resumes typing and provides the typing input that matches with a corresponding displayed character. In this example representation, the user has provided an input character 'a' instead of providing input character 'e' which precludes provisioning of the animated graphics on the image frame 420.

Referring now to FIG. 4C, the image frame 430 is a consecutive frame of the animated video and is displayed to the user after the user corrects his/her mistake (input character) and provides the correct typing input. It has to be noted that the image frame that is displayed to the user when the user corrects his/her mistake (mismatch in displayed character 'e') is similar to image frame 320 (shown in FIG. 3B) and is not explained herein again for the sake of brevity. The image frame 430 depicts the user providing the typing input (input character 'e'), that matches with the corresponding displayed character. The image frame 430 shown in FIG. 4C is similar to the third image frame 330 shown in FIG. 3C. In this example representation, displayed word 'e' associated with displayed character 'e' in which the user had provided an incorrect typing input is highlighted in the second color 432 (shown as a block) to the user. The preclusion of animated characters such as, rabbit and birds in the image frame 420 upon detecting the mismatch are now displayed on the image frame 430 depicting continuous playback of the animated graphics. It shall be noted that volume of the audio associated with the portion of the story is played back at a first volume level upon restoration of playback of the animated graphics in the image frame 430.

Figure 5:
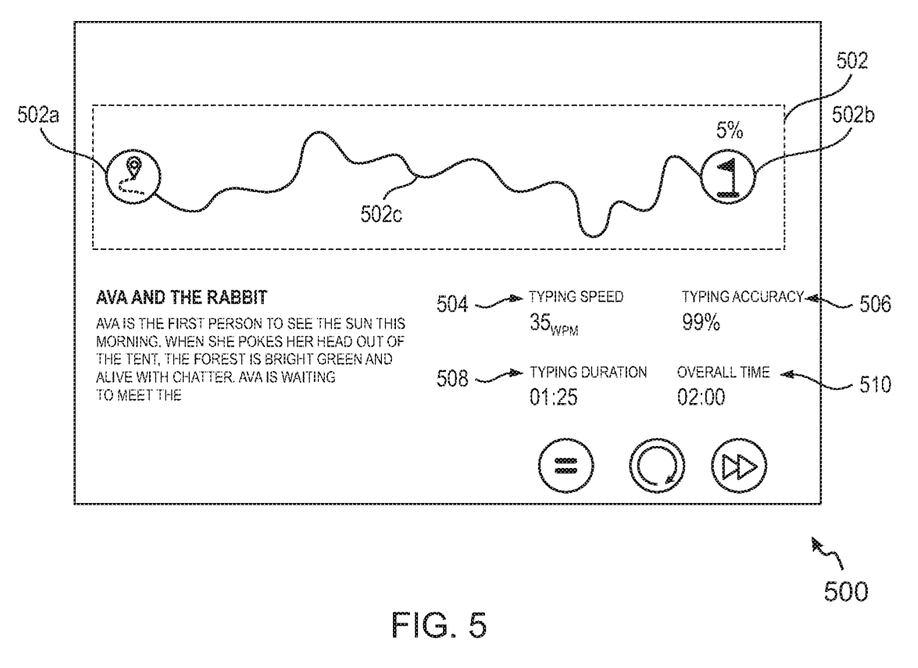
FIG. 5 shows an example representation of a UI depicting a results page displayed to a user upon completion of a portion of a story, in accordance with an example embodiment.

FIG. 5 shows an example representation of a UI depicting a result page 500 displayed to a user upon completion of a portion of a story, in accordance with an example embodiment. It shall be noted that the result page 500 is provisioned on the UI of the electronic device 104 upon the user providing the typing input corresponding to the plurality of displayed words in the text 312 (shown in FIG. 3A). The result page 500 displays an evaluated performance of the user in providing the typing input corresponding to the text 312 on the first image frame 310.

The result page 500 includes a progress tracker 502 depicting progress of the user in providing the typing input corresponding to a story in terms of percentage. The progress tracker 502 comprises a starting point 502a and an end point 502b. The starting point 502a and the end point 502b are connected using a line 502c. When the user completes providing typing input corresponding to at least a part of the story (or section), the result page 500 is displayed depicting the progress of the user on the progress tracker 502 and the evaluation metrics. In this example representation, a portion of the line 502c is highlighted to indicate that the user has completed a portion of the story (or section) that amounts to completing 5% of the story. For example, if the user has completed one portion from the available ten portions of the story, so his/her progress percentage will be 10%. The progress percentage is calculated using formula:

Progress Percentage=(Number of sections completed/ Total number of sections of the story)*100.

The result page 500 also includes the evaluation metrics corresponding to performance of the user for the respective portion of the story. The performance of the user includes evaluation metrics, such as a user typing speed 504, a typing accuracy 506, a typing duration 508 and an overall time 510 associated with the typing input. The user typing speed 504 is speed at which the user provides the typing input. The user typing speed 504 corresponds to number of input words in the typing input provided by the user in a minute and is represented as words per minute (wpm) i.e. The typing accuracy 506 is a measure of total number of input characters provided as typing input by the user that matched with the total number of displayed characters in the portion (or section) of the story at a first time instant. For example, if there are 100 displayed characters in the portion of the story, and the user has provided 99 input characters that matched with the displayed characters at the first instant of providing the typing input, the typing accuracy 506 of the user is determined as 99%. The typing accuracy 506 is calculated using a formula described with reference to FIG. 2.

The typing duration 508 indicates a time taken by the user to complete the portion of the story. The typing duration 508 does not include any pauses taken by the user for more than 5 seconds. For example, if the user has completed the portion of the story in 2 minutes (120 seconds) but he/she has also taken breaks in between while providing typing inputs. The breaks include two breaks of 10 seconds, one break of 8 seconds and one break of 7 seconds. So, his overall break time accounts to 10+10+8+7=35. While determining the typing duration 508, the break time of 35 seconds is excluded from the typing duration 508 such that the typing duration 508 will be 120−35=85 seconds (1 minute 25 seconds). The overall time 510 is the summation of the typing duration 508 and all the breaks taken by the user for more than 5 seconds till the completion of the portion of the story. So, the value of the overall time 510 for the user is 2 minutes.

Figure 6:
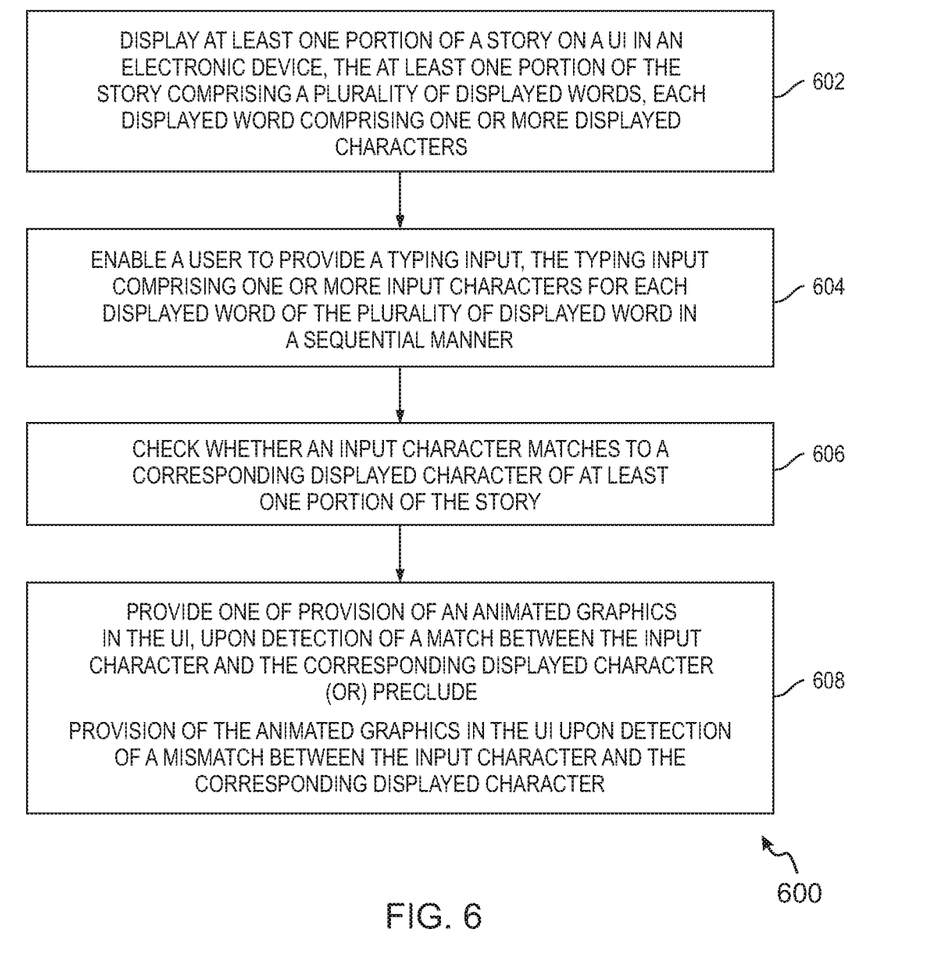
FIG. 6 is a flowchart illustrating a method for providing typing practice to users, in accordance with an example embodiment.

FIG. 6 is a flowchart illustrating a method 600 for providing a typing practice to users, in accordance with an example embodiment. The operations of the method 600 may be carried out by a server such as the server system 108, the system 200 or the electronic device 104. The sequence of operations of the method 600 may not be necessarily executed in the same order as they are presented. Further, one or more operations may be grouped together and performed in form of a single step, or one operation may have several sub-steps that may be performed in parallel or in sequential manner.

At operation 602, the method 600 includes displaying at least one portion of a story on a User Interface (UI) in an electronic device. The at least one portion of the story comprises a plurality of displayed words, wherein each displayed word comprises one or more displayed characters. For example, the portion of the story displayed on the UI contains the text "My journey to an adventure capital of the world". Here 'My', 'journey' 'to' and so on represents the plurality of displayed words and characters 'M', 'y' represents the displayed characters of the displayed word 'My'.

At operation 604, the method 600 includes enabling a user to provide a typing input. The typing input comprises one or more input characters for each displayed word of the plurality of displayed words in a sequential manner. The typing input is provided by using a keypad such as, the input interface 212. The term 'sequential manner' implies providing the typing input in a same sequence as shown in display screen of the electronic device (e.g., the electronic device 104). For example, the displayed portion of the story include words "My journey to an adventure capital of the world", so providing the typing input in a sequential manner implies providing a typing input sequence of 'M', 'y', ' ', 'j' and so on.

At operation 606, the method 600 includes upon receiving the typing input, checking whether an input character matches to a corresponding displayed character of the at least one portion of the story. The typing input comprises an input character. The input character provided by the user is matched with the corresponding displayed character of the at least one portion of the story to determine whether the input character and the displayed character match or not.

At operation 608, the method 600 includes performing provisioning of an animated graphics in the UI upon detection of match between the input character and the corresponding displayed character or precluding provisioning of the animated graphics in the UI upon detection of mismatch between input character and the corresponding displayed character. For example, the touch-typing platform is configured to provision animated graphics such as, animated character of a girl cuddling her dog if the touch-typing platform determines a match between the input characters of the typing input and the corresponding displayed character. For instance, the animated characters and objects may spring alive when the match is determined. Alternatively, when the touch-typing platform determines a mismatch between an input character of the typing input and a corresponding displayed character, the animated graphics are not provisioned on the display screen of the electronic device 104. For example, animated movements of the girl and dog may pause temporarily upon determination of the mismatch. Additionally or optionally, a volume of the audio may be reduced to a pre-defined level on detecting the mismatch between the input character and the corresponding displayed character.

Figure 7:
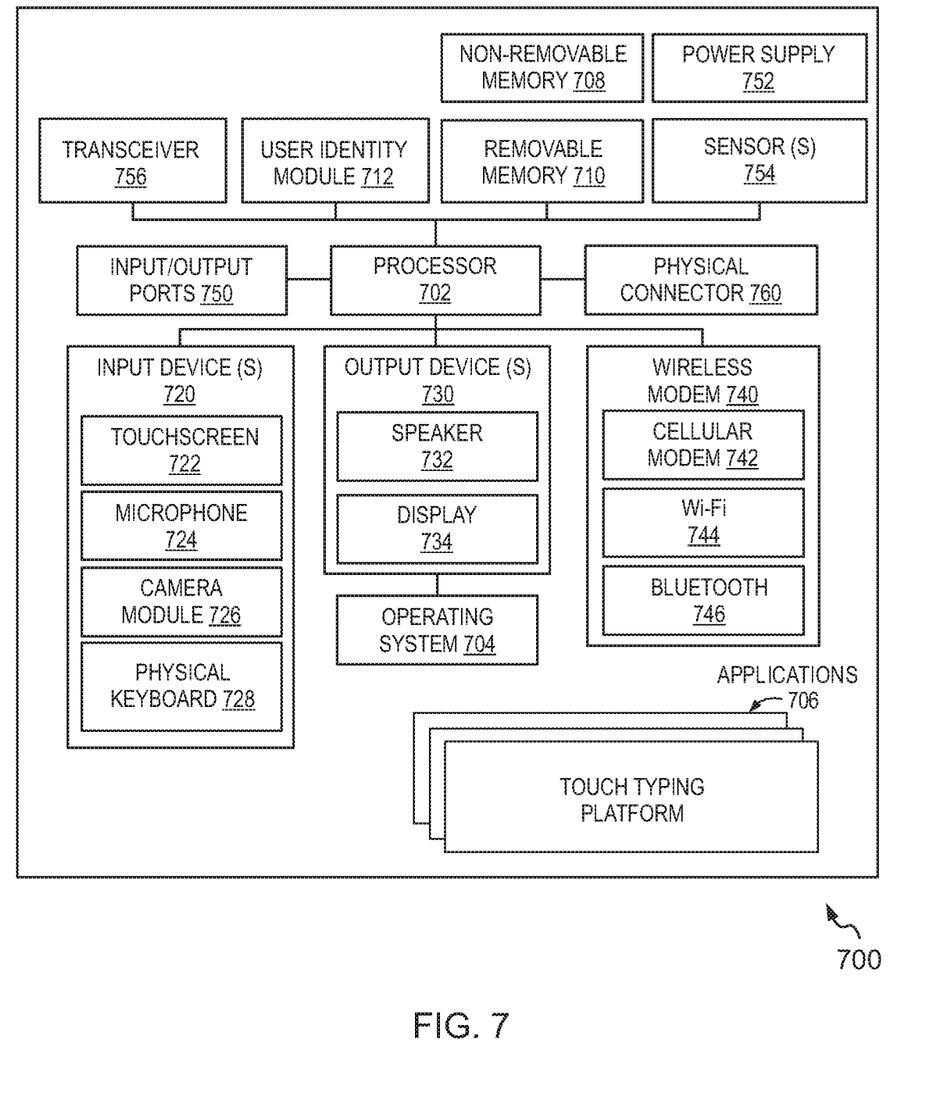
FIG. 7 is a block diagram of an electronic device, in accordance with an example embodiment.

FIG. 7 shows a simplified block diagram of an electronic device 700 capable of implementing the various embodiments of the present disclosure. The electronic device 700 may be an example of the electronic device 104. In an embodiment, the various operations related to providing a typing practice to users can be facilitated using a touch-typing platform 706 installed in the electronic device 700. It should be understood that the electronic device 700 as illustrated and hereinafter described is merely illustrative of one type of device and should not be taken to limit the scope of the embodiments. As such, it should be appreciated that at least some of the components described below in connection with that the electronic device 700 may be optional and thus in an example embodiment may include more, less or different components than those described in connection with the example embodiment of the FIG. 7. As such, among other examples, the electronic device 700 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and support for one or more applications programs (see, the touch-typing platform 106) that implements one or more of the innovative features described herein. The applications 706 may include common mobile computing applications (e.g., telephony applications, email applications, calendars, contact managers, web browsers, messaging applications such as USSD messaging or SMS messaging or SIM Tool Kit (STK) application) or any other computing application. The touch-typing platform is configured to be in operative communication with other applications for example, through the OS or using API Calls, for enabling a user to learn the touch-typing skill.

The illustrated electronic device 700 includes one or more memory components, for example, a non-removable memory 708 and/or a removable memory 710. The non-removable memory 708 and/or the removable memory 710 may be collectively known as database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the touch-typing platform 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 6, or one or more operations of the flow diagram 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiberoptic cable), magnetic communications, electromagnetic communications (including RF, microwave, and infrared communications), electronic communications, or other such communication means.

FIG. 8 is a simplified block diagram of a server system 800, in which the touch-typing platform 106 may be stored, in accordance with one embodiment of the present disclosure. The server system 800 is an example of the server system 108 shown and explained with reference to FIG. 1. The server system 800 includes a computer system 802 and one or more database, such as a database 804.

The computer system 802 includes a processor 806 for executing instructions. Instructions may be stored in, for example, but not limited to, a memory 808. The processor 806 may include one or more processing units (e.g., in a multi-core configuration). The processor 806 is operatively coupled to a communication interface 810 such that the computer system 802 is capable of communicating with a remote device such as an electronic device 820. Some examples of the electronic device 820 may include, but are not limited to the electronic device 104 shown in FIG. 1.

The processor 806 may also be operatively coupled to the database 804. The database 804 is configured to store the touch-typing platform 106 capable of enabling a user to learn the touch-typing skill as explained with reference to FIGS. 1 to 6. The database 804 is any computer-operated hardware suitable for storing and/or retrieving data. The database 804 may include multiple storage units such as hard disks and/or solid-state disks in a redundant array of inexpensive disks (RAID) configuration. The database 804 may include, but not limited to, a storage area network (SAN) and/or a network attached storage (NAS) system.

In some embodiments, the database 804 is integrated within the computer system 802. For example, the computer system 802 may include one or more hard disk drives as the database 804. In other embodiments, the database 804 is external to the computer system 802 and may be accessed by the computer system 802 using a storage interface 812. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 806 with access to the database 804.

The memory 808 is a storage device embodied as one or more volatile memory devices, one or more non-volatile memory devices, and/or a combination of one or more volatile memory devices and non-volatile memory devices, for storing micro-contents information and instructions. The memory 808 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.,).

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application\or implementation without departing from the spirit or scope of the claims.

What is claimed is:

1. A method of providing a typing practice to users, comprising:
    displaying at least one portion of a story on a User Interface (UI) in an electronic device, the at least one portion of the story comprising a plurality of displayed words, each displayed word comprising one or more displayed characters;
    enabling a user to provide a typing input, the typing input comprising one or more input characters for each displayed word of the plurality of displayed words in a sequential manner; and
    upon receiving the typing input, performing:
        checking whether an input character matches to a corresponding displayed character of the at least one portion of the story; and
        generating a control signal configured to control display of animated graphics for performing one of:
            upon detection of a match between the input character and the corresponding displayed character, provisioning the animated graphics in the UI; and
            upon detection of a mismatch between the input character and the corresponding displayed character, precluding provisioning of the animated graphics in the UI, wherein the animated graphics correspond to animated characters, which come alive to create an expression of the at least one portion of the story being played back visually for the user.

2. The method as claimed in claim 1, wherein the at least one portion of the story is one of: a paragraph of the story; a section of the story; and entire story.

3. The method as claimed in claim 1, wherein performing provisioning of the animated graphics comprises at least one of:
    highlighting the corresponding displayed character of the at least one portion of the story in a first colour; and
    performing a playback of an audio associated with the at least one portion of the story.

4. The method as claimed in claim 3, wherein precluding provisioning of the animated graphics comprises at least one of:
    highlighting the corresponding displayed character of the at least one portion of the story in a second colour; and
    performing the playback of the audio associated with the at least one portion of the story by reducing a volume of the audio to a pre-defined level.

5. The method as claimed in claim 3, wherein upon not receiving the typing input for a pre-determined time, the method further comprises performing at least one of:
    precluding the provisioning of the animated graphics in the UI; and
    performing the playback of the audio associated with the at least one portion of the story by reducing a volume of the audio to a pre-defined level.

6. The method as claimed in claim 1, further comprising:
    calculating at least one evaluation metric based on the typing input provided by the user to complete the at least one portion of the story; and
    displaying a result comprising the at least one evaluation metric of the user on the UI of the electronic device.

7. The method as claimed in claim 6, wherein the at least one evaluation metric is at least one of:
    a user typing speed;
    a typing accuracy;
    a typing duration; and
    an overall time associated with the typing input.

8. The method as claimed in claim 6, further comprising:
    storing the result of the user for the at least one portion of the story.

9. A system of providing a typing practice to users, comprising:
    a memory configured to store instructions; and
    a processor configured to execute the instructions stored in the memory and thereby cause the system to perform:
        displaying at least one portion of a story on a User Interface (UI) in an electronic device, the at least one portion of the story comprising a plurality of displayed words, each displayed word comprising one or more displayed characters;
        enabling a user to provide a typing input, the typing input comprising one or more input characters for each displayed word of the plurality of displayed words in a sequential manner; and upon receiving the typing input, performing:
checking whether an input character matches to a corresponding displayed character of the at least one portion of the story; and
generating a control signal configured to control display of animated graphics for performing one of:
upon detection of a match between the input character and the corresponding displayed character, provisioning the animated graphics in the UI; and
upon detection of a mismatch between the input character and the corresponding displayed character, precluding provisioning of the animated graphics in the UI,
wherein the animated graphics correspond to animated characters that come alive to create an expression of the at least one portion of the story being played back visually for the user.

10. The system as claimed in claim 9, wherein the at least one portion of the story is one of: a paragraph of the story; a section of the story; and entire story.

11. The system as claimed in claim 9, wherein upon performing provisioning of the animated graphics, the processor is caused to:
highlight the corresponding displayed character of the at least one portion of the story in a first colour; and
perform a playback of an audio associated with the at least one portion of the story.

12. The system as claimed in claim 11, wherein upon precluding provisioning of the animated graphics, the processor is further caused to:
highlight the corresponding displayed character of the at least one portion of the story in a second colour; and
perform the playback of the audio associated with the at least one portion of the story by reducing a volume of the audio to a pre-defined level.

13. The system as claimed in claim 11, wherein upon not receiving the typing input for a pre-determined time, the processor is further configured to:
preclude the provisioning of the animated graphics in the UI; and
perform the playback of the audio associated with the at least one portion of the story by reducing a volume of the audio to a pre-defined level.

14. The system as claimed in claim 9, wherein the processor is further caused to:
calculate at least one evaluation metric based on the typing input provided by the user to complete the at least one portion of the story; and
display a result comprising the at least one evaluation metric of the user on the UI of the electronic device.

15. The system as claimed in claim 14, wherein the at least one evaluation metric is at least one of:
a user typing speed;
a typing accuracy;
a typing duration; and
an overall time associated with the typing input.

16. The system as claimed in claim 14, wherein the processor is further caused to store the result of the user for the at least one portion of the story.

17. A system, comprising:
a User Interface (UI) module comprising:
an output interface module for displaying at least one portion of a story, the at least one portion of the story comprising a plurality of displayed words, each displayed word comprising one or more displayed characters; and
an input interface module for receiving a typing input from a user, the typing input comprising one or more input characters for each displayed word of the plurality of displayed words in a sequential manner;
an error detection module configured to check whether an input character of the one or more input characters matches to a corresponding displayed character of the one or more displayed character of the at least one portion of the story; and
an animation module configured to provision animated graphics in the UI upon detecting a match between the input character and the corresponding displayed character of the at least one portion of the story and to preclude provision of the animated graphics in the UI upon detecting a mismatch between the input character and the corresponding displayed character of the at least one portion of the story, wherein the animated graphics correspond to animated characters that come alive to create an expression of the at least one portion of the story being played back visually for the user.

18. The system as claimed in claim 17, further comprises a performance computation module for evaluating performance of the user providing the typing input by computing at least one evaluation metric based on the typing input provided by the user for completing the at least one portion of the story.

19. The system as claimed in claim 17, wherein the error detection module is further configured to: highlight a displayed character of the at least one portion of the story in a first colour if the input character of the one or more input characters matches with the corresponding displayed character of the at least one portion of the story.

20. The system as claimed in claim 17, wherein the animation module is further configured to perform a playback of an audio associated with the at least one portion of the story:
at a first volume level on determining the match between the input character and the corresponding displayed character; and
at a second volume level on determining the mismatch between the input character and the corresponding displayed character.

* * * * *